United States Patent [19]

Timpe

[11] Patent Number: 5,029,721
[45] Date of Patent: Jul. 9, 1991

[54] DISPOSABLE COOKING UTENSIL
[75] Inventor: William W. Timpe, Barrington, Ill.
[73] Assignee: Packaging Corporation of America, Evanston, Ill.
[21] Appl. No.: 542,736
[22] Filed: Jun. 22, 1990
[51] Int. Cl.$^5$ .............................................. B65D 90/00
[52] U.S. Cl. .................................... 220/94 R; 220/95; 220/401; 229/3.5 MF
[58] Field of Search ............. 220/85 H, 95, 401, 94 R; 229/3.5 MF, 405, 85 H, 94 R, 95, 401

[56] References Cited

U.S. PATENT DOCUMENTS

| | | | |
|---|---|---|---|
| 3,082,906 | 3/1963 | Reed | 220/95 |
| 4,717,038 | 1/1988 | Anders | 220/95 X |
| 4,817,812 | 4/1989 | Sarnoff et al. | 220/401 X |
| 4,852,760 | 8/1989 | Sarnoff et al. | 220/85 H |
| 4,969,569 | 11/1990 | Anders | 220/95 X |

*Primary Examiner*—Steven M. Pollard
*Attorney, Agent, or Firm*—Neuman, Williams, Anderson & Olson

[57] ABSTRACT

An improved disposable cooking utensil is provided having a preformed thin gauge pan and a skeletal handle assembly. The pan has a bottom panel, a side wall extending upwardly therefrom, a rim having an inner portion connected to the upper edge of the side wall, an intermediate portion extending laterally outwardly therefrom, and a reinforcing bead connected to an outer portion of the rim. The handle assembly includes a first section and an angularly disposed second section connected thereto. The first section is provided with an elongate base subtending and supporting the pan bottom panel and side segments extending upwardly from opposite ends of the base. Each side segment is provided with an exposed handle extending from the pan reinforcing bead. The handle assembly second section includes an elongate first member connected to the base and subtending and supporting the pan bottom panel. Second members connected to and extending upwardly from opposite ends of the first member are in proximity to the exterior surface of the pan side wall. Each second member has an offset end segment extending outwardly towards the reinforcing bead and in subtending supporting engagement with the rim intermediate portion. Each offset end segment is fixedly secured to the rim intermediate portion by a fastener. Neither the offset end segment or the fastener protrudes outwardly beyond the reinforcing bead.

9 Claims, 1 Drawing Sheet

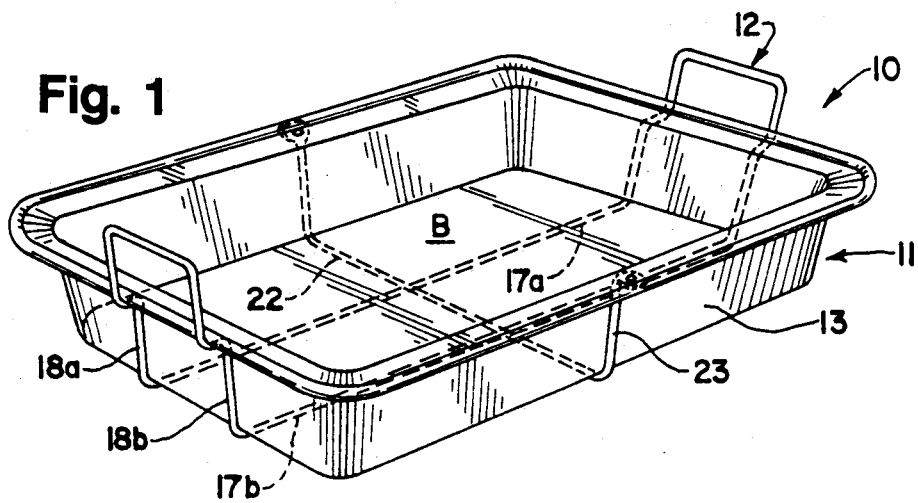
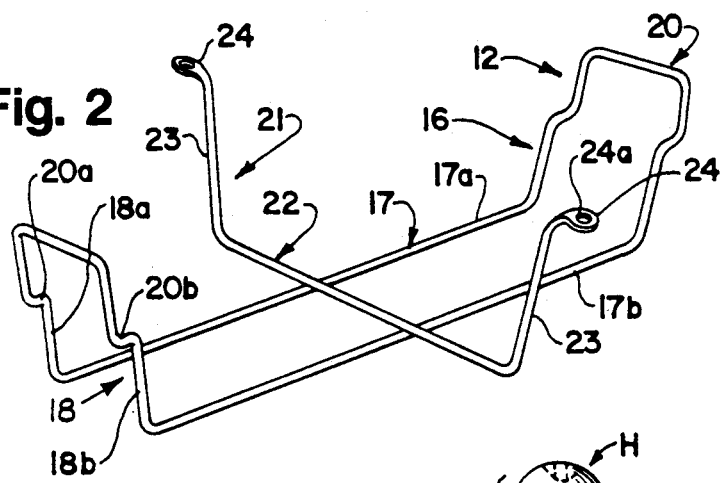
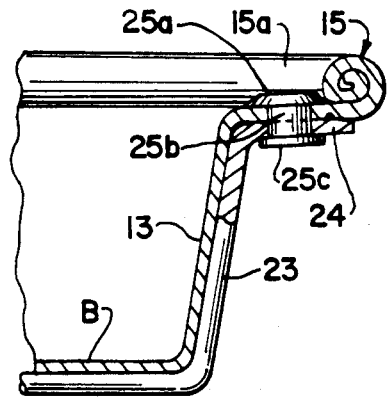
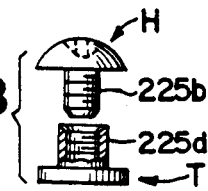
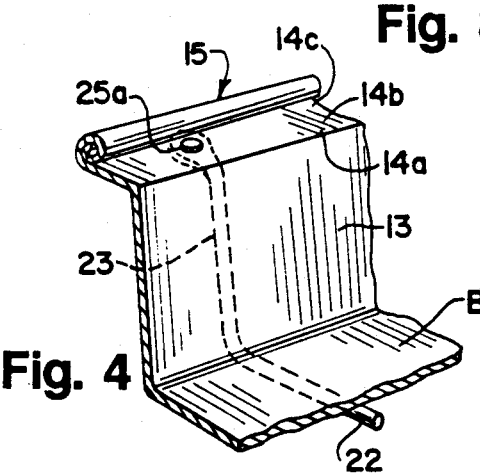
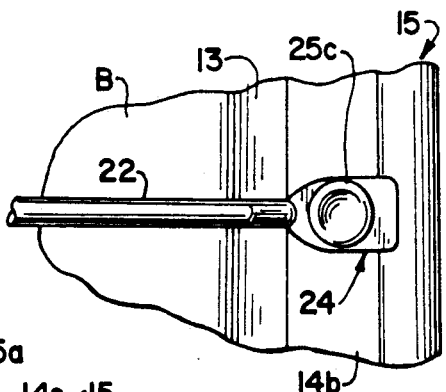
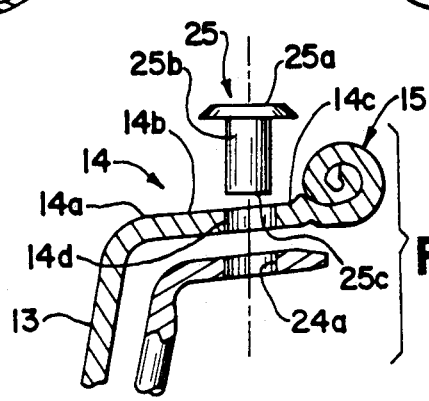

DISPOSABLE COOKING UTENSIL

BACKGROUND OF THE INVENTION

Various disposable and inexpensive cooking utensils, such as pans for use in heating and/or cooking food products, such as hams, roasts, turkeys, etc. have become popular because they are relatively inexpensive and eliminate the need for pan cleaning after the heating and/or cooking of the food product has occurred. Such utensils are normally formed of thin gauge, inexpensive material, such as aluminum foil. Unless such thin gauge material is reinforced or the gauge of the material is significantly increased, handling of such utensils when loaded, may be hazardous unless extreme care is exercised. To improve the inherent strength of the pan by increasing the material gauge results in the cost becoming inordinately high thereby adversely affecting its marketability as a disposable items.

Reinforcing of the thin gauge pan by utilizing a handle or frame assembly therewith appears to be a practical and feasible way to overcome the shortcomings besetting thin gauge pans. Various prior reinforced pans are disclosed in Anders U.S. Pat. No. 4,717,038; and Sarnoff et al. U.S. Pat. Nos. 4,817,812 and 4,852,760. The serious shortcomings of the Anders structure, however, are that it utilizes an inordinate number of components, and thus is awkward and expensive to assemble. In the Sarnoff et al. U.S. Pat. No. 4,817,812 structure the frame assembly therein disclosed is not fixedly attached to the pan and thus, the loaded pan may inadvertently or accidentally become disassembled therefrom during handling. Furthermore, the frame assembly does not extend upwardly the full height of the pan side wall and thus, in certain instances might not provide stable lateral support for the loaded pan when being manually transported. The Sarnoff et al. U.S. Pat. No. 4,852,760 structure on the other hand utilizes a handle assembly wherein a frame section thereof has opposite end segments which extend over and are crimped to a reinforcing bead formed in the pan rim. Care must be exercised in properly crimping the bead so as not to break the bead and adversely affect the strength of the pan and that the proper amount of crimping force is applied to provide a secure engagement between the pan and frame section. Furthermore, a wire bending fixture of complex shape is required and once the crimp is formed, a portion of each crimped end segment projects outwardly from the pan bead and is susceptible of snagging or tearing clothing or scratching the hands or arms of the person handling the pan.

SUMMARY OF THE INVENTION

Thus, an improved disposable cooking utensil has been provided which avoids the aforenoted shortcomings besetting prior utensils of this general type.

The improved cooking utensil is of an inexpensive, simple design, may be readily and safely handled when the pan is loaded, and does not require an inordinate amount of space for cooking or storage.

Further and additional advantages possessed by the improved cooking utensil will become apparent from the description, accompanying drawings, and appended claims.

In accordance with one embodiment of the invention a disposable cooking utensil is provided which comprises a preformed pan of inexpensive thin gauge material and a handle assembly supportingly accommodating the pan and being affixed thereto. The pan includes a bottom panel for subtending and supporting the food product to be heated and/or cooked. Connected to the periphery of the bottom panel and extending upwardly therefrom is a side wall which encompasses the bottom panel. Connected to the upper edge of the side wall and extending laterally outwardly therefrom is a rim which includes an inner portion connected to the side wall upper edge, an outwardly projecting intermediate portion, and an outer portion spaced from the inner portion. A reinforcing bead is connected to the rim outer portion and has at least a segment thereof projecting upwardly relative to the rim intermediate portion.

The handle assembly includes a first section having an elongate base subtending and supporting the pan bottom panel. Extending upwardly from opposite ends of the base are side segments which are proximate to the exterior surface of the pan side wall. Each end segment is provided with an exposed handle. The handle assembly also includes a second section having an elongate first member which subtends and supports the pan bottom panel. The first member is fixedly connected to the first section base and extends angularly relative thereto. Second members are connected to and extend upright from opposite ends of the first member and are disposed in proximity to the exterior of the pan side wall. Each upright second member is provided with an outwardly offset end segment which subtends and supportingly engages the rim intermediate portion. Each offset end segment is affixed by a rivet to the rim intermediate portion. Neither the rivets nor the second section offset end segments extend outwardly beyond the pan reinforcing bead.

DESCRIPTION

For a more complete understanding of the invention, reference is made to the drawings wherein FIG. 1 is a perspective top view of a preferred embodiment of the improved cooking utensil;

FIG. 2 is similar to FIG. 1 but of the handle assembly per se utilized in the utensil shown in FIG. 1;

FIG. 3 is an enlarged fragmentary sectional view taken along line 3—3 of FIG. 1;

FIG. 4 is an enlarged fragmentary perspective top view looking outwardly from the interior of the utensil and showing one rivet affixing the pan rim to one offset end segment of the handle assembly second section.

FIG. 5 is a top plan view of the utensil shown in FIG. 4.

FIG. 6 is similar to FIG. 3 but showing the components thereof in exploded relation.

FIG. 7 is an enlarged fragmentary sectional view, similar to FIG. 3, but showing a second embodiment of the fastener securing the pan rim to the handle assembly.

FIG. 8 is an enlarged side elevational of a third embodiment of a fastener and showing the components thereof in an exploded relation.

Referring now to the drawings and more particularly to FIG. 1, a preferred embodiment of the improved disposable cooking utensil 10 is shown. The utensil embodies a preformed pan 11 of thin gauge, inexpensive sheet material (i.e., aluminum foil) and a skeletal handle assembly 12 which is fixedly secured to the pan. The pan may be of the type disclosed in U.S. Pat. No. 4,616,762 issued Oct. 14, 1986, and is particularly suitable for use in heating and/or cooking food products such as hams, roasts, turkeys and the like in conventional gas or electric ovens. The pan includes a bottom panel B which may have a rectangular, square, polygonal, oval or round shape. The shape of the bottom panel will depend upon the size and shape of the food product resting thereupon. Normally, the bottom panel is provided with stiffening ribs or protuberances. Integral with the bottom panel and extending divergently upwardly from the periphery thereof is a continuous side wall 13. The bottom panel B and the side wall cooperate with one another to define the space in which the food product is disposed.

Integral with the upper edge of the side wall and extending laterally outwardly therefrom is a rim 14. The rim has an inner portion 14a connected to the side wall upper edge, a laterally extending intermediate portion 14b, and an outer portion 14c spaced outwardly from the inner portion, see FIG. 6. Integral with outer portion 14c is a reinforcing bead 15 having at least a segment 15a thereof extending upwardly from the rim intermediate portion 14b. The bead 15 may be in the form of a tight coil, see FIG. 6, which is continuous and encompasses the rim 14.

The handle assembly 12, as seen more clearly in FIG. 2, is preferably formed of bent metal wire which is capable of withstanding high cooking temperatures (e.g. 500° F.) for extended periods of time involving many hours without altering its shape and stiffness. The cooking temperature and time depend upon the food product in question. The handle assembly in the illustrated embodiment includes a first section 16 having an elongate base 17 which subtends and supportingly engages the pan bottom panel B. The base 17 normally includes a pair of spaced, parallel wire segments 17a, 17b which span in one direction the underside of the pan bottom panel. The upright segments 18a, 18b. The upright segments diverge a small amount from the respective wire segment and conform substantially to the divergence of the pan side wall 13. Each upright segment is disposed in proximity to the exterior of the pan side wall and terminates at the rim inner portion 14a. The corresponding upper ends of the segments 18a, 18b are connected to corresponding offset ends 20a, 20b of an inverted U-shaped handle 20. The offset ends subtend and engage the rim intermediate portion 14b and protrude outwardly beyond the reinforcing bead 15. The remainder of the handle 20 extends upwardly and slightly outwardly from the bead to facilitate manual gripping, when the loaded utensil is being inserted into or removed from the oven cavity, not shown.

Affixed to the handle assembly first section 16 and angularly disposed with respect thereto is a second section 21. The section 21 includes an elongate first member 22 which spans the underside of the bottom panel B in a second direction; the latter being substantially perpendicular to the first direction of the wire segments 17a, 17b. The first and second sections may be affixed to one another by welding or the like.

The opposite ends of the first member are connected to second members 23 which diverge upwardly from the first member and are in proximity to the exterior of the pan side wall 13 and correspond substantially to the divergence thereof. Each second member extends substantially the full height of the side wall and terminates in an outwardly offset end segment 24. The offset end segment 24 is flattened and enlarged and extends to the rim reinforcing bead 15, but not beyond. The configuration of the offset end segments 24 enables same to be in face to face relation with the underside of the rim intermediate portion 14b. Each offset end segment is provided with a transverse opening 24a, see FIG. 6. The end segments 24 are affixed to the pan intermediate portion 14b by rivets 25 of conventional design. Each rivet 25 has an enlarged flat or rounded head 25a, and a depending shank 25b which is sized to be readily accommodated in the opening 24a. The shank 25b extends through either a preformed opening 14d in the rim intermediate portion 14b or the leading end 25c of the shank may pierce the pan material at the time the rivet is assembled with the rim intermediate portion and the subtending offset end segment 24. Once the rivet shank 25b has been inserted through the rim intermediate portion and the opening 24a in the offset end segment 24, the leading end 25c of the shank protrudes downwardly from the underside of the offset end segment and is forced to assume an enlarged state, see FIG. 3 thereby securely retaining the rim intermediate portion and the offset end segment in face to face relation between the rivet head 25a and enlarged leading end of the rivet shank. The shape and size of the rivet head 25a may vary from that shown; however, it is most desirable that the head not project upwardly from the rim intermediate portion 14b more than bead segment 15a and that the head not extend beyond the rim inner and outer portions 14a and 14c, respectively. Thus, once the rivets are assembled with the pan rim and offset end segments 24, there is no portion of the rivet which protrudes from the pan and handle assembly so as to accidentally catch or snag clothing or scratch the arms or hands of the person handling the utensil when either empty or loaded. Furthermore, the rivets do not interfere with nesting of empty utensils.

While rivets are shown as fasteners, the latter may also take the form of screws 125, see FIG. 7 with each screw having a shank with a self-tapping leading end; or screws 225, see FIG. 8 having a head component H with an externally threaded depending shank 225b and a tail component T with an internally threaded hollow shank 225d. The head 225a of the component H overlies the pan rim. Component T is provided with an enlarged head 225e which engages the underside of offset end segment 24. The head and tail components are interchangeable. In some instances, the opening 24a in the offset end segment may be internally threaded thus, eliminating the component T.

Thus, a simple, inexpensive yet durable cooking utensil has been provided which may be readily assembled, manually or by mechanical means. While the improved cooking utensil has been described for use in heating and/or cooking a food product, it is not intended to be limited thereto, but may be used to heat a variety of liquid products as well as non-edible products.

I claim:

1. A disposable cooking utensil comprising a preformed pan of thin gauge material and a handle assembly, said pan including a bottom panel for subtending and supportingly engaging a product; an encompassing side wall connected to and extending upwardly from said bottom panel; a rim having an inner portion connected to an upper edge of said side wall, an intermediate portion connected to said inner portion and extending laterally outwardly from the side wall upper edge, and an outer portion spaced from said inner portion; and a reinforcing bead connected to said rim outer portion and encompassing said rim intermediate portion; said handle assembly having a skeletal configuration and including a first section having an elongate base subtending and supportingly engaging said pan bottom panel, and side segments connected to and extending upwardly from opposite ends of said base and being in proximity to exterior portions of said pan side wall, each side segment being provided with handle means connected only to an upper portion of said side segment and extending from said reinforcing bead, and a second section independent of said handle means and having an elongate first member disposed intermediate and spaced from said handle means and subtending and supporting said pan bottom panel and being connected to and extending angularly from the first section, and opposing second members connected to and extending upwardly from opposite ends of said first member, said second members being in proximity to exterior portions of said pan side wall, each second member having an outwardly offset end segment subtending and supportingly engaging the rim intermediate portion and extending towards but not beyond said reinforcing bead, and means spaced from said handle means and fixedly securing the rim intermediate portion to each subtending offset end segment.

2. The cooking utensil of claim 1 wherein the means includes a shank extending from a head through the rim intermediate portion and an opening formed in the subtending offset end segment.

3. The cooking utensil of claim 2 wherein each offset end segment has a flattened configuration and is in substantially face to face engagement with an under surface of the rim intermediate portion.

4. The cooking utensil of claim 2 wherein at least a section of a rim reinforcing bead protrudes upwardly from the upper surface of the rim intermediate portion and the means head is recessed relative to the protruding bead section.

5. The cooking utensil of claim 2 wherein the shank has a self-tapping leading end.

6. The cooking utensil of claim 2 wherein the shank is externally threaded and the subtending offset end segment opening is preformed and internally threaded.

7. The cooking utensil of claim 1 wherein the means fixedly securing the rim intermediate portion to a subtending offset end segment is a rivet and neither the offset end segment or the rivet protrude outwardly beyond the pan reinforcing bead.

8. The cooking utensil of claim 1 wherein the means for securing the pan rim to the offset end segments of the handle assembly includes a plurality of screw fasteners; each fastener is provided with a head component having an externally threaded, depending shank aligned with an opening formed in a subtending offset end segment, and a tail component having an upstanding internally threaded shank, the latter being aligned with the offset end segment opening and threadably accommodating the shank of the head component.

9. The cooking utensil of claim 8 wherein the head and tail components are interchangeable.

* * * * *

UNITED STATES PATENT AND TRADEMARK OFFICE
CERTIFICATE OF CORRECTION

PATENT NO. : 5,029,721

DATED : July 9, 1991

INVENTOR(S) : William W. Timpe

It is certified that error appears in the above-identified patent and that said Letters Patent is hereby corrected as shown below:

Column 3, line 36, after "The" (first occurrence) insert --opposite ends of the wire segments are connected to--

Column 6, line 4, "a" should be --the--

Column 6, line 5, "the" should be --an--

Signed and Sealed this

Twentieth Day of October, 1992

Attest:

DOUGLAS B. COMER

Attesting Officer

Acting Commissioner of Patents and Trademarks